US009014122B2

(12) United States Patent
Lee et al.

(10) Patent No.: US 9,014,122 B2
(45) Date of Patent: Apr. 21, 2015

(54) METHOD AND APPARATUS OF CONVERTING TV CHANNELS INTO WLAN CHANNELS IN A WIRELESS LOCAL AREA NETWORK SYSTEM

(75) Inventors: Jihyun Lee, Gyeonggi-do (KR); Byoung Hoon Kim, Gyeonggi-do (KR); Eunsun Kim, Gyeonggi-do (KR); Yongho Seok, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 269 days.

(21) Appl. No.: 13/812,217

(22) PCT Filed: Feb. 9, 2011

(86) PCT No.: PCT/KR2011/000842
§ 371 (c)(1),
(2), (4) Date: Mar. 20, 2013

(87) PCT Pub. No.: WO2012/015133
PCT Pub. Date: Feb. 2, 2012

(65) Prior Publication Data
US 2014/0307634 A1    Oct. 16, 2014

Related U.S. Application Data

(60) Provisional application No. 61/367,463, filed on Jul. 26, 2010.

(51) Int. Cl.
*H04W 16/14*    (2009.01)
*H04W 72/04*    (2009.01)
*H04W 72/08*    (2009.01)
*H04L 5/00*    (2006.01)
*H04L 27/00*    (2006.01)

(52) U.S. Cl.
CPC ....... *H04W 72/0453* (2013.01); *H04L 27/0006* (2013.01); *H04W 16/14* (2013.01); *H04W 72/082* (2013.01); *H04L 5/0098* (2013.01)

(58) Field of Classification Search
None
See application file for complete search history.

(56) References Cited

U.S. PATENT DOCUMENTS

| 2010/0046440 | A1 | 2/2010 | Singh | |
| 2010/0085921 | A1 | 4/2010 | Wu et al. | |
| 2010/0107209 | A1 | 4/2010 | Rouhana | |
| 2011/0287802 | A1* | 11/2011 | Ma et al. | 455/517 |
| 2012/0026941 | A1* | 2/2012 | Ahmad et al. | 370/328 |
| 2014/0003361 | A1* | 1/2014 | Song et al. | 370/329 |

OTHER PUBLICATIONS

International Search Report issued in corresponding International Application No. PCT/KR2011/000842 dated Nov. 8, 2011.

* cited by examiner

*Primary Examiner* — Hassan Phillips
*Assistant Examiner* — Ayanah George
(74) *Attorney, Agent, or Firm* — Morgan, Lewis & Bockius LLP

(57) ABSTRACT

A method of converting TV channels into WLAN channels in a wireless local area network system (WLAN) is disclosed. A method of converting TV channels into WLAN channels at an apparatus comprising receiving WSM including a list of available TV channels and finding out a center frequency of each of first WLAN channels which exist on frequency area of the available TV channels using TV channel bandwidth, WLAN channel bandwidth and a starting frequency of each of the available TV channels, wherein the TV channel bandwidth and the WLAN channel bandwidth are predetermined.

10 Claims, 9 Drawing Sheets

Fig. 6
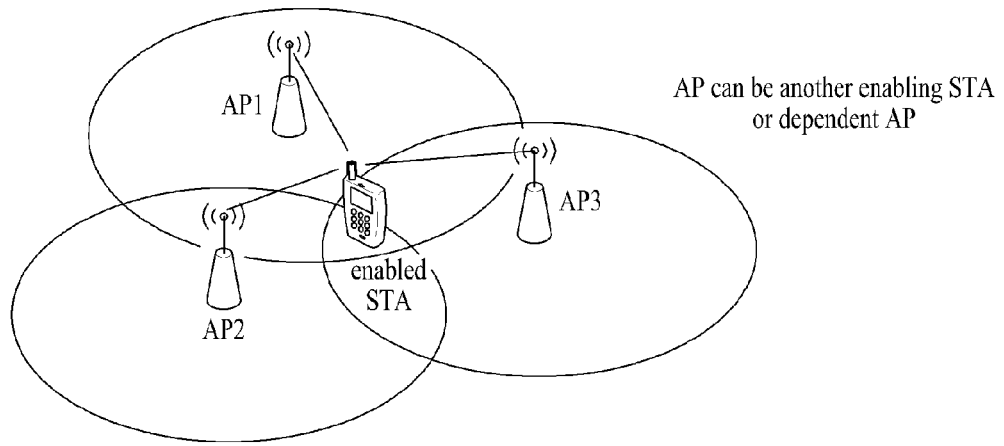
Fig. 7
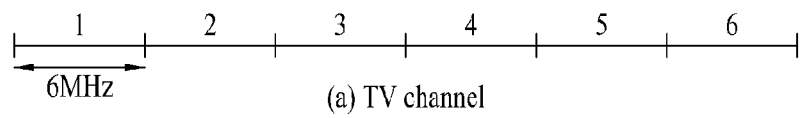
(a) TV channel
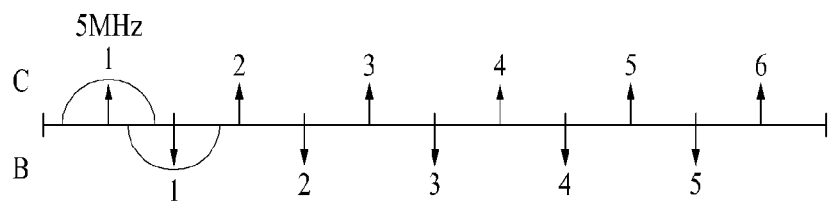
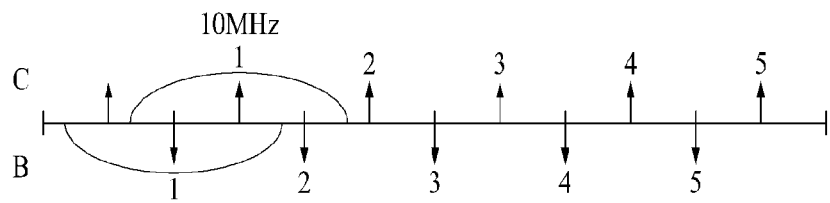
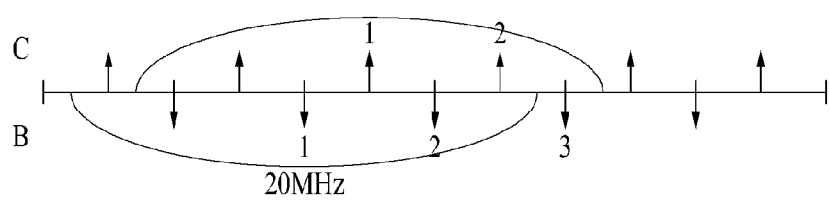
(b) WLAN channel Fig. 11
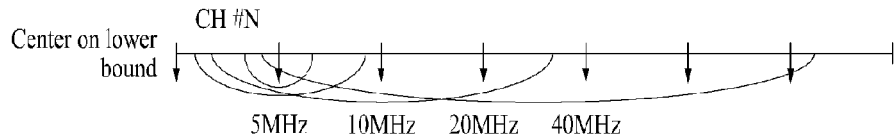
Fig. 12
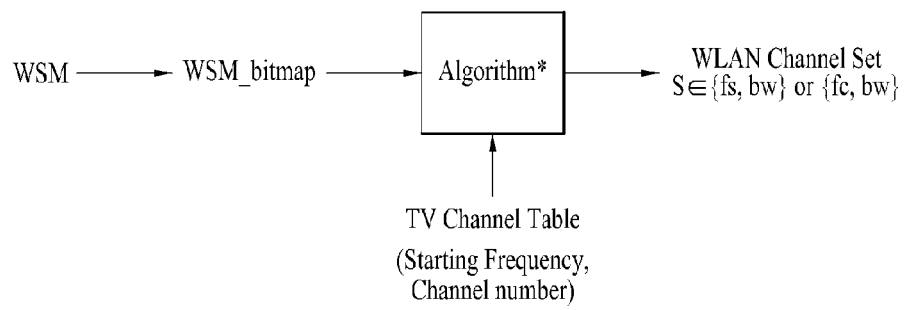
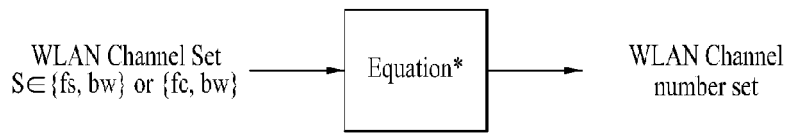
Fig. 13
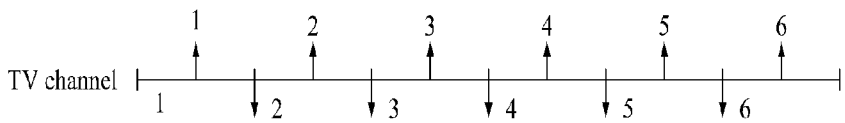
|   | 1 | 2 | 3 | 4 | 5 | 6 |
|---|---|---|---|---|---|---|
| 1 | C5 |  |  |  |  |  |
|   |  |  |  |  |  |  |
| 2 | - | C5 |  |  |  |  |
|   | - | B5, B10 |  |  |  |  |
| 3 |  | C10 | C5 |  |  |  |
|   |  | - | B5, B10 |  |  |  |
| 4 |  |  | C10 | C5 |  |  |
|   |  |  | B20 | B5, B10 |  |  |
| 5 |  |  | C20 | C10 | C5 |  |
|   |  |  |  | B20 | B5, B10 |  |
| 6 |  |  |  | C20 | C10 | C5 |
|   |  |  |  |  | B20 | B5, B10 |

Fig. 14

```
getWLANchannel:
//initial condition
1)  n = 1, fc = F0s+TV Channel Bandwidth/2, (Fc, Fs) = φ, x = 1
    //F0s is a starting frequency of first TV channel among consecutive available TV channels, fc is a center
    Frequency of first WLAN Channel
    n is TV channel number, x is the number of consecutive available TV channels //     TV channel n is not vacant
2) if WSM_bitmap(n) = 1
    2a) fc = fc+TV Channel Bandwidth, n++, x=1
    2b) if n = N+1, terminate //N the number of TV channels //if not, find the (fc, fs) set introduced by adding channel x, add (fc, fs) to (Fc, Fs)
3) If WSM_bitmap(n) = 0
    3a) if WLAN Channel Bandwidth <= TV Channel bandwidth:
        f = fc, (Fc, Fs) < (f, f-WLAN Channel Bandwidth/2)

3b) If x-1 = 1 and WLAN Channel Bandwidth <= 2 * TV Channel Bandwidth:
        f = fc-TV Channel Bandwidth/2, (Fc, Fs) < (f, f-WLAN Channel Bandwidth/2) //lower bound of CH x
        for k = 1: k++:
    3c) If x >= 2k+1 and (2k-1) * TV Channel Bandwidth < WLAN Channel Bandwidth <= (2k+1) * TV Channel Bandwidth
        f = fc-TV Channel Bandwidth * k //center frequency of CH x-1
        (Fc, Fs) < (f, f-WLAN Bandwidth/2)

3d) If x >= 2k+2 and 2k * TV Channel Bandwidth < WLAN Channel Bandwidth <= (2k+2) * TV Channel Bandwidth
        f = fc-TV Channel Bandwidth * k-TV Channel Bandwidth/2
        //lower bound of CH x-1
        (Fc, Fs) < (f, f-WLAN Bandwidth/2)

//move onto next channel
4) x++, n++, fc = fc+TV Channel Bandwidth
    if n = N+1, terminate
//iteration
5) Go back to 2)
```

Fig. 15

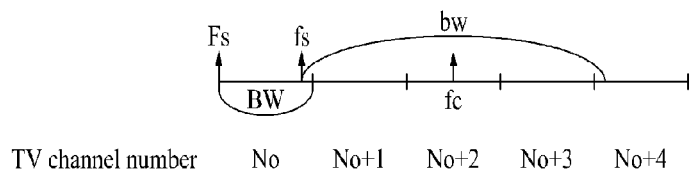

TV channel number    No    No+1    No+2    No+3    No+4

Fig. 16

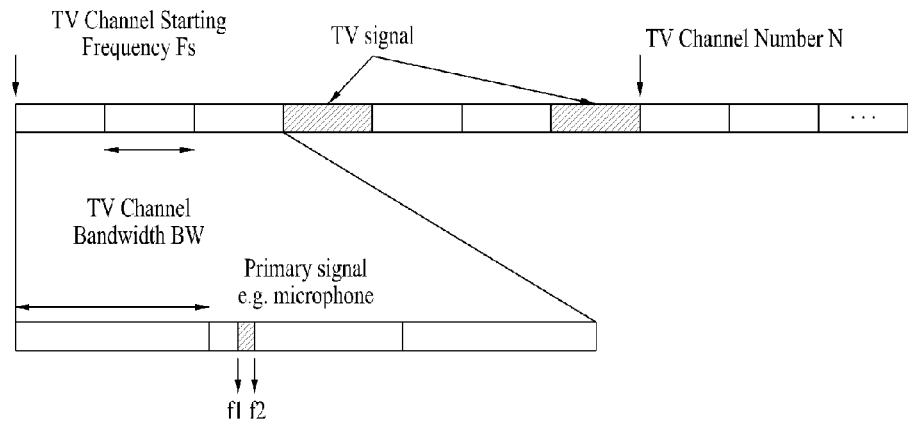

METHOD AND APPARATUS OF CONVERTING TV CHANNELS INTO WLAN CHANNELS IN A WIRELESS LOCAL AREA NETWORK SYSTEM

This is a U.S. National Phase Entry of PCT Application No. PCT/KR2011/000842, filed Feb. 9, 2011, and claims the benefit of US Provisional Application No. 61/367,463 filed Jul. 26, 2010.

TECHNICAL FIELD

The present invention relates to a wireless local area network (WLAN), and more particularly, to a method of converting TV channels into WLAN channels in a wireless local area network system (WLAN)

BACKGROUND ART

The standard for a Wireless Local Area Network (WLAN) technology is established by IEEE 802.11 standard association. IEEE 802.11a/b among IEEE 802.11 standards provides 11 Mbps (IEEE 802.11b) or 54 Mbps (IEEE 802.11a) transmission efficiency using unlicensed band on 2.4. GHz or 5 GHz frequency band. IEEE 802.11g, adapting OFDM (Orthogonal Frequency Divisional Multiplexing) technology, provides 54 Mbps transmission efficiency. And, IEEE 802.11n, adapting MIMO-OFDM technology, provides 300 Mbps transmission efficiency for 4 spatial streams. IEEE 802.11n provides 40 MHz channel bandwidth, and in this case it provides up to 600 Mbps transmission efficiency.

Now, a standard for regulating the WLAN operation in TV White Space is under establishment, as IEEE 802.11af.

TV Whitespace includes channels allocated to broadcast TV, which are permitted to be used by cognitive radio device. TV White Space may include UHF band and VHF band. The spectrum not used by a licensed device (hereinafter, can be called as 'White Space') can be used by an unlicensed device. The frequency band permitted to be used by unlicensed device can be differently defined for each country. Generally, this frequency band comprises 54-698 MHz (US, Korea), and some of this frequency band can't be used for the unlicensed device. Here, 'licensed device' means a device of the user permitted in this frequency band, and can be differently called as 'primary user', or 'incumbent user'. Hereinafter, the term of 'incumbent user' can be collectively used for these terms.

512-608 MHz and 614-698 MHz are permitted to be used by all kinds of unlicensed devices except a few of special cases. However, 54-60 MHz, 76-88 MHz, 174-216 MHz and 470-512 MHz are permitted to be used by fixed devices, which perform transmission at a fixed location.

Unlicensed device should provide a protection mechanism for the incumbent user. That is, the unlicensed device should stop using a specific channel, when an incumbent user, such as wireless microphone, is using that specific channel.

Therefore, the unlicensed device, which wishes to use the TV White Space (TVWS), shall acquire information for available channel list at its location. Hereinafter, the unlicensed device operating in the TVWS using MAC (Medium Access Control) and PHY (Physical) operation according to IEEE 802.11 can be called as TVWS terminal.

The unlicensed device acquires a list of available channels having a first channel granularity and operates using channels having the second channel granularity.

For example, in order to operate in TVWS as an unlicensed device, a station (STA) should find the network to be connected. This type of process may be called as 'scanning'. Whiles the unlicensed device acquired available TV channel list have a first channel granularity, it performs scanning on a WLAN channel. Thus, algorithm for converting TV channels into WLAN channels is necessary.

DISCLOSURE OF INVENTION

Technical Problem

The object of the present invention is providing efficient algorithm for converting channels having first channel granularity into channels having second channel granularity.

The object of the present invention is not limited the above stated objects, but includes various objects recited or apparent among the detailed description of the present invention.

Solution to Problem

One aspect of the present invention provides a method of converting TV channels into WLAN channels at an apparatus in a regulatory domain where a licensed device and an unlicensed device are permitted to operate together in a wireless local area network system (WLAN) comprising receiving WSM including a list of available TV channels; and finding out a center frequency of each of first WLAN channels which exist on frequency area of the available TV channels using TV channel bandwidth, WLAN channel bandwidth and a starting frequency of each of the available TV channels, wherein the TV channel bandwidth and the WLAN channel bandwidth are predetermined.

Preferably, the starting frequency of each of the available TV channels is derived from TV channel number of each of the available TV channels using a TV channel table for matching TV channel number and a starting frequency of TV channel, wherein the TV channel number is included in the WSM and the TV channel table is stored in the station.

Preferably, the step of finding out comprises obtaining the center frequency of the each of the first WLAN channels, which starts in range of each of consecutive available TV channels among the available channels.

Preferably, the step of obtaining comprises calculating a center frequency of each of second WLAN channels whose center frequency is on a center frequency of a TV channel and calculating a center frequency of each of third WLAN channels whose center frequency is on a lower boundary of a TV channel, wherein the first WLAN channels include second WLAN channels and third WLAN channels.

Preferably, the method further comprises deriving a starting frequency of each of first WLAN channels from the center frequency of each of the first WLAN channels and the WLAN channel bandwidth.

Preferably, the method further comprises deriving WLAN channel number of each of first WLAN channels from the center frequency of each of the first WLAN channels and the WLAN channel bandwidth using a WLAN channel number equation, wherein the WLAN channel number equation defines unique WLAN channel number for a center frequency and a starting frequency of a WLAN channel.

Preferably, the method further comprises deriving WLAN channel number of each of first WLAN channels from the starting frequency of each of the first WLAN channels and the WLAN channel bandwidth using a WLAN channel number equation, wherein the WLAN channel number equation defines unique WLAN channel number for a center frequency and a starting frequency of a WLAN channel.

Another aspect of the present invention provides an apparatus of converting TV channel into WLAN channel at a station in a regulatory domain where a licensed device and an unlicensed device are permitted to operate together in a wireless local area network system (WLAN) comprising a transceiver configured to receive WSM including a list of available TV channels; and a processor configured to find out a center frequency of each of first WLAN channels which exist on frequency area of the available TV channels using TV channel bandwidth, WLAN channel bandwidth, the number of consecutive available TV channels and a starting frequency of each of the available TV channels, wherein the TV channel bandwidth and the WLAN channel bandwidth are predetermined.

Another aspect of the present invention provides a method of converting WLAN channels into TV channels at an apparatus in a regulatory domain where a licensed device and an unlicensed device are permitted to operate together in a wireless local area network system (WLAN) comprises deriving a center frequency and a bandwidth of a WLAN channel from a WLAN channel number of the WLAN channel; and finding out TV channels mapped to the WLAN channel using the center frequency, the bandwidth of the WLAN channel, a starting frequency of an arbitrary TV channel, a TV channel number of the arbitrary TV channel and a bandwidth of a TV channel.

Advantageous Effects of Invention

According to embodiments of the present invention, TV channels can be converted into WLAN channels efficiently.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 6 shows a procedure of scanning.

FIG. 7 shows TV channels and WLAN channels.

FIG. 11 shows WLAN channels which start in a TV channel N in case that a center frequency of a WLAN channel is on a lower boundary of a TV channel.

FIG. 12 shows a method of converting TV channel into WLAN channel in a wireless local area network system (WLAN) according to second embodiment of the present invention.

FIG. 13 shows algorithm for searching WLAN channels.

FIG. 14 shows the algorithm for searching WLAN channels according to second embodiment of the present invention.

FIG. 15 shows TV channels mapped to a WLAN channel.

FIG. 16 shows an example of available WLAN channel change by a primary signal having low transmission power and small bandwidth.

BEST MODE FOR CARRYING OUT THE INVENTION

Reference will now be made in detail to the embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

For the convenience of description and better understanding of the present invention, general structures and devices well known in the art will be omitted or be denoted by a block diagram or a flow chart.

First of all, Wireless Local Area Network (WLAN) system in which embodiments of the present invention can be applied is explained.

Figure 1:
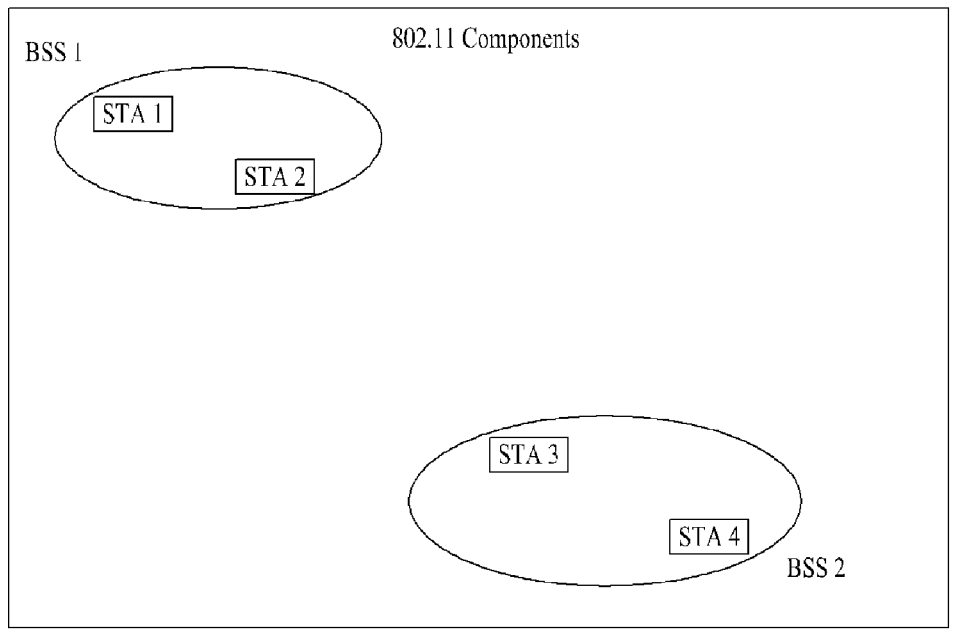
FIG. 1 shows an exemplary architecture of IEEE 802.11 system.

FIG. 1 shows an exemplary architecture of IEEE 802.11 system.

The IEEE 802.11 architecture consists of several components that interact to provide a WLAN that supports STA (station) mobility transparently to upper layers. The basic service set (BSS) is the basic building block of an IEEE 802.11 LAN. FIG. 1 shows two BSSs, each of which has two STAs that are members of the BSS. It is useful to think of the ovals used to depict a BSS as the coverage area within which the member STAs of the BSS may remain in communication. (The concept of area, while not precise, is often good enough.) This area is called the Basic Service Area (BSA). If a STA moves out of its BSA, it can no longer directly communicate with other STAs present in the BSA.

The independent BSS (IBSS) is the most basic type of IEEE 802.11 LAN. A minimum IEEE 802.11 LAN may consist of only two STAs. Since the BSSs shown in FIG. 1 are simple and lack other components (contrast this with FIG. 2), the two can be taken to be representative of two IBSSs. This mode of operation is possible when IEEE 802.11 STAs are able to communicate directly. Because this type of IEEE 802.11 LAN is often formed without pre-planning, for only as long as the LAN is needed, this type of operation is often referred to as an ad hoc network.

A STA's membership in a BSS is dynamic (STAs turn on, turn off, come within range, and go out of range). To become a member of a BSS, a STA joins the BSS using the synchronization procedure. To access all the services of an infrastructure BSS, a STA shall become "associated." These associations are dynamic and involve the use of the distribution system service (DSS).

Figure 2:
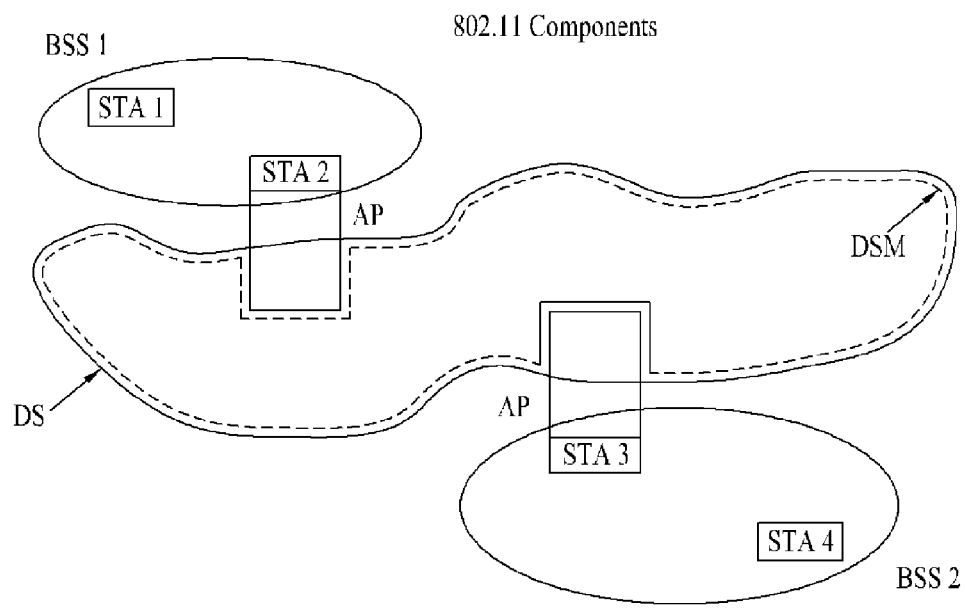
FIG. 2 is another exemplary architecture of IEEE 802.11 system in which the DS, DSM and AP components are added to the IEEE 802.11 architecture picture.

FIG. 2 is another exemplary architecture of IEEE 802.11 system in which the DS, DSM and AP components are added to the IEEE 802.11 architecture picture.

PHY limitations determine the direct station-to-station distance that may be supported. For some networks, this distance is sufficient; for other networks, increased coverage is required. Instead of existing independently, a BSS may also form a component of an extended form of network that is built with multiple BSSs. The architectural component used to interconnect BSSs is the DS (Distribution System).

IEEE Std 802.11 logically separates the WM (wireless Medium) from the distribution system medium (DSM). Each logical medium is used for different purposes, by a different component of the architecture. The IEEE 802.11 definitions neither preclude, nor demand, that the multiple media be either the same or different.

Recognizing that the multiple media are logically different is the key to understanding the flexibility of the architecture. The IEEE 802.11 LAN architecture is specified independently of the physical characteristics of any specific implementation.

The DS enables mobile device support by providing the logical services necessary to handle address to destination mapping and seamless integration of multiple BSSs.

An access point (AP) is any entity that has STA functionality and enables access to the DS, via the WM for associated STAs.

Data move between a BSS and the DS via an AP. Note that all APs are also STAs; thus they are addressable entities. The addresses used by an AP for communication on the WM and on the DSM are not necessarily the same.

Data sent to the AP's STA address by one of the STAs associated with it are always received at the uncontrolled port for processing by the IEEE 802.1X port access entity. In addition, if the controlled port is authorized, these frames conceptually transit the DS.

Hereinafter, Extended Service Set (ESS) for a large coverage network is explained.

Figure 3:
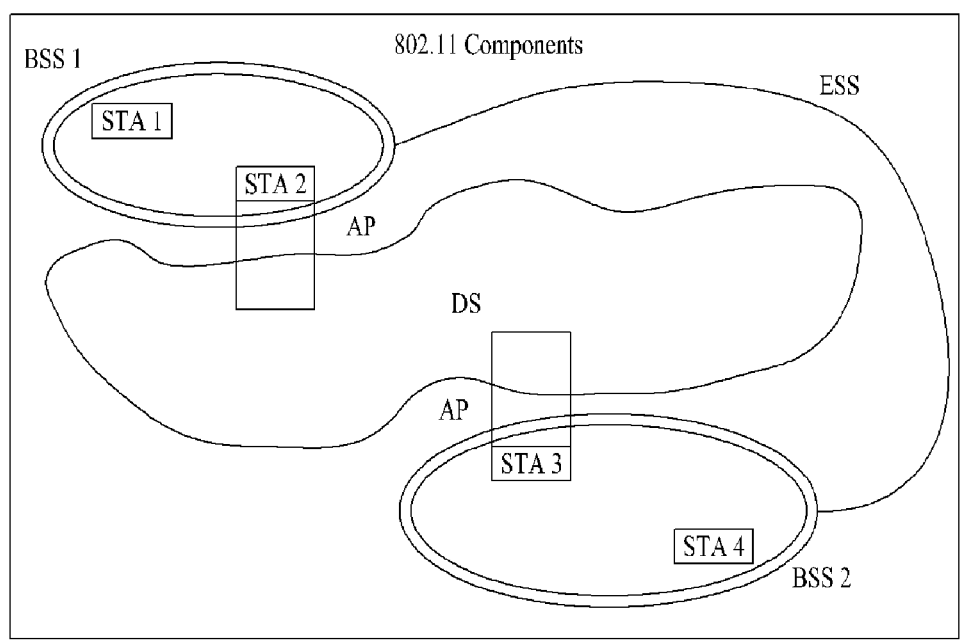
FIG. 3 shows another exemplary architecture of IEEE 802.11 system for explaining the concept of ESS.

FIG. 3 shows another exemplary architecture of IEEE 802.11 system for explaining the concept of ESS.

The DS and BSSs allow IEEE Std 802.11 to create a wireless network of arbitrary size and complexity. IEEE Std 802.11 refers to this type of network as the ESS network. An ESS is the union of the BSSs connected by a DS. The ESS does not include the DS. The key concept is that the ESS network appears the same to an LLC (logical link control) layer as an IBSS network. STAs within an ESS may communicate and mobile STAs may move from one BSS to another (within the same ESS) transparently to LLC.

Nothing is assumed by IEEE Std 802.11 about the relative physical locations of the BSSs in FIG. 3. All of the following are possible:

The BSSs may partially overlap. This is commonly used to arrange contiguous coverage within a physical volume.

The BSSs could be physically disjoint. Logically there is no limit to the distance between BSSs.

The BSSs may be physically collocated. This may be done to provide redundancy.

One (or more) IBSS or ESS networks may be physically present in the same space as one (or more) ESS networks. This may arise for a number of reasons. Some examples are when an ad hoc network is operating in a location that also has an ESS network, when physically overlapping IEEE 802.11 networks have been set up by different organizations, and when two or more different access and security policies are needed in the same location.

Figure 4:
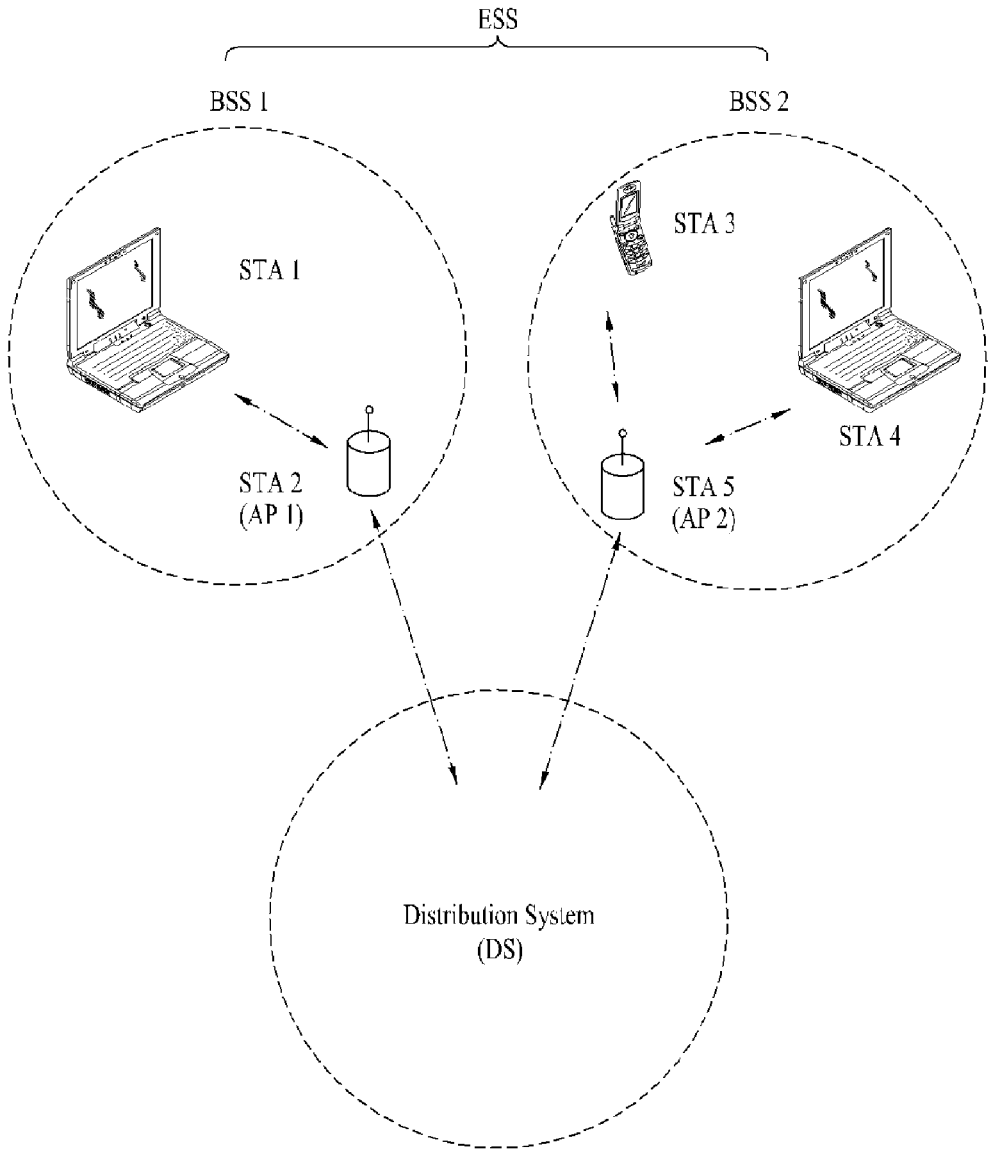
FIG. 4 shows exemplary system architecture for better understanding the WLAN system.

FIG. 4 shows exemplary system architecture for better understanding the WLAN system.

As can be understood, FIG. 4 is an example of infrastructure BSS including DS. And BSS 1 and BSS 2 consist of ESS. In WLAN system, a STA is a device operating according to MAC/PHY regulation of IEEE 802.11, and includes an AP STA and non-AP STA, such a laptop computer, mobile phone, etc. Usually, the device which a user directly handles is non-AP STA. Hereinafter, non-AP STA can be differently called as (terminal), WTRU (Wireless Transmit/Receive Unit), User Equipment (UE), Mobile Station (MS), Mobile Terminal, Mobile Subscriber Unit, etc. And, non-AP STA, which can operate within TVWS spectrum, can be called as 'Non-AP WS STA' or 'WS STA'. AP can corresponds to Base Station (BS), Node-B, BTS (Base Transceiver System), or Femto BS in another field of wireless communication. AP, which can operate within TVWS, can be called as WS AP.

Hereinafter, the method of converting TV channel into WLAN channel in a regulatory domain where a licensed device and an unlicensed device are permitted to operate together in a wireless local area network system (WLAN) according to embodiments of the present invention are disclosed.

Embodiments of the present invention explain converting between TV channels and WLAN channels for example. However, the present invention can be applied to converting between channels having first channel granularity and channels having second channel granularity.

First, white Space MAP (WSM) and scanning will be explained referring to FIGS. 5 and 6.

The unlicensed devices (STAs) can be classified into an enabling STA, and a dependent STA. Enabling STA in TVWS is defined as a STA determines the available TV channels at its location using its own geographic location identification and TV bands database access capabilities. Dependent STA in TVWS is defined as a STA receives available TV channel list from the enabling STA or the dependent AP of that enabling STA that enables its operation. The available TV channel list can be called as White Space Map (WSM). Thus, enabling STA takes the role to permit the dependent STA to operate within TVWS within the available channels (the role to enable the dependent STA). This enabling procedure can be called as dynamic station enablement (DSE) procedure.

Figure 5:
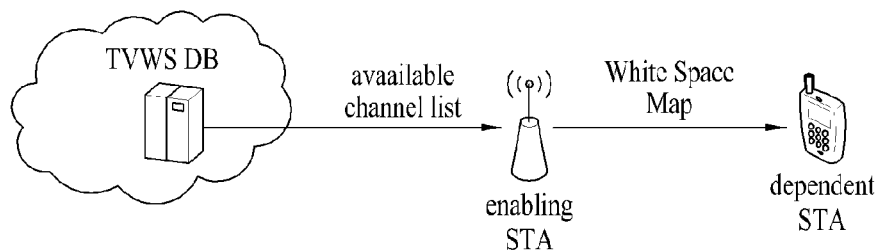
FIG. 5 shows a procedure of receiving WSM.

FIG. 5 shows a procedure of receiving WSM. As show in FIG. 5, a dependent STA receives WSM from an enabling STA during enablement process. WSM indicates whether TV channels, whose granularity is 6 MHZ, are occupied by a primary user or not. The WSM includes list of available channels and maximum allowed transmission powers of the available channels.

FIG. 6 shows a procedure of scanning.

As shown in FIG. 6, the enabled dependent STA performs scanning to find an AP to be associated with. Whiles available channels in WSM are TV channels, AP operates on WLAN channels. Thus, the dependent STA shall perform scanning on WLAN channels. Therefore, the dependent STA should convert TV channels in WSM into WLAN channels.

FIG. 7 shows TV channels and WLAN channels. As shown in FIG. 7, granularity of WLAN channel can be 5 MHz, 10

MHz, 20 MHz, 40 MHz. And, center frequency of WLAN channel can be on center or lower bound of TV channel.

Next, a method of converting TV channel into WLAN channel in a wireless local area network system (WLAN) according to first embodiment of the present invention is explained referring to draws. In an embodiment of the present invention, a case that converting TV channel into WLAN channel is performed by a STA will be explained for example. But, converting TV channel into WLAN channel can be performed by an apparatus such DB or an enabling STA.

A STA has a table for matching TV channel number and a starting frequency of TV channel. And, it also has WLAN channel number equation. WLAN channel number equation defines unique channel number for a center frequency of a WLAN channel and WLAN channel bandwidth. Or, WLAN channel number equation defines unique channel number for a starting frequency of a WLAN channel and WLAN channel bandwidth. Thus, a STA can find out WLAN channel number from a center frequency and a starting frequency of a WLAN channel.

According to first embodiment of the present, a STA receives WSM including available TV channel list and finds out a starting frequency of each of the available TV channels. And then, it finds out a center frequency and a starting frequency of each of WLAN channels, which exist on frequency area of available TV channels, using the starting frequency of each of the available TV channels. And then, it finds out a WLAN channel number of the each of WLAN channels from the center frequency and the starting frequency of the each of WLAN channels.

Figure 8:
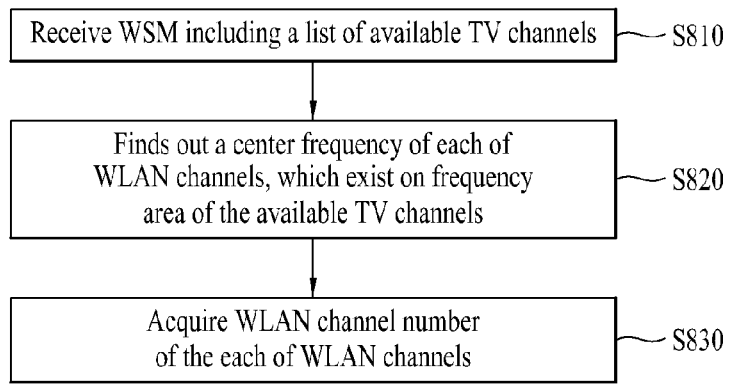
FIG. 8 shows a flow chart of a method of converting TV channel into WLAN channel according to first embodiment of the present invention.

FIG. 8 shows a flow chart of a method of converting TV channel into WLAN channel according to first embodiment of the present invention.

As shown in FIG. 8, a STA receives WSM including a list of available TV channels in step S810. WSM includes TV channel number of each of available TV channels.

The STA finds out a center frequency of each of WLAN channels, which exist on frequency area of the available TV channels in step S820.

The STA can finds out a starting frequency of each of the available TV channels from TV channel number of each of available TV channels using a TV channel table for matching TV channel number and a starting frequency of TV channel. And the STA can be aware of the number of consecutive available TV channels from WSM. And, bandwidth of a TV channel and a WLAN channel can be predefined. In embodiments of the present invention, it is assumed that bandwidth of a TV channel is 6 MHZ and bandwidths of a WLAN channel are 5 MHz, 10 MHz, 20 MHz and 40 MHz.

The STA finds out a center frequency of each of WLAN channels using a starting frequency of each of the available TV channels, the number of consecutive available TV channels, bandwidth of a TV channel and bandwidth of a WLAN channel.

A STA finds out a center frequency of each of WLAN channels, which start in range of each of consecutive available TV channels and exist on frequency area of the consecutive available TV channels, for two cases. One case is that a center frequency of a WLAN channel is on a center frequency of a TV channel. The other case is that a center frequency of a WLAN channel is on a lower boundary of a TV channel.

A scheme of finding out a center frequency of each of WLAN channels, which start in a TV channel, in case that a center frequency of a WLAN channel is on a center frequency of a TV channel will be explained referring FIG. 9.

Figure 9:
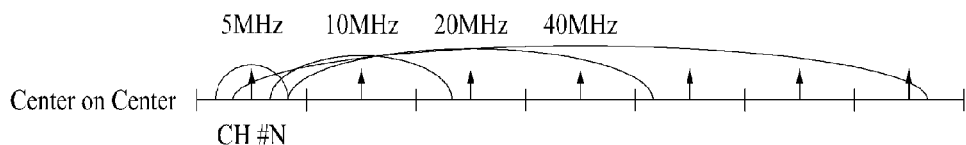
FIG. 9 shows WLAN channels which start in a TV channel N in case that a center frequency of a WLAN channel is on a center frequency of a TV channel.

FIG. 9 shows WLAN channels which start in a TV channel N in case that a center frequency of a WLAN channel is on a center frequency of a TV channel. WLAN channels illustrated in FIG. 9 start in a TV channel N and bandwidth of each of them is 5 MHz, 10 MHz, 20 MHz and 40 MHz, respectively.

In case that a center frequency of a WLAN channel is on a center frequency of a TV channel, a center frequency of WLAN channels, which start in the TV channel N, satisfies equation 1.

$$f_c - F_s(N) = x \times BW + \frac{BW}{2} \quad \text{[Equation 1]}$$

In the Equation 1, $f_c$ represents a center frequency of a WLAN channel, $F_s(N)$ represents a starting frequency of a TV channel N, BW represents bandwidth of a TV channel, and x is an integer above 0.

x satisfies equation 2 for bandwidth of a WLAN channel, bw.

$$BW \times (x-1) + \frac{BW}{2} < \frac{bw}{2} \leq BW \times x + \frac{BW}{2} \quad \text{[Equation 2]}$$

Bandwidth of a WLAN channel should satisfy equation 3 so that the WLAN channel exists on frequency area of the consecutive available TV channels.

$$\left| \frac{\frac{bw}{2}}{BW} - 0.5 \right| \leq \frac{M-1}{2} \quad \text{[Equation 3]}$$

In the Equation 3, M represents the sum of 1 and the number of TV channels which exist after TV channel N among consecutive available TV channels.

For example, if the number of consecutive available TV channels is L and first TV channel among consecutive available TV channels is TV channel N, set of consecutive available TV channels is {N, N+1, N+1, ..., N+L−1}. And M is L for TV channel N, M is L−1 for TV channel N−1, and M is 1 for TV channel N+L−1.

Equation 4 can be derived from equation 1 and equation 2.

$$f_c = F_s(N) + \left\lceil \frac{\frac{bw}{2}}{BW} - 0.5 \right\rceil \times BW + \frac{BW}{2} = \quad \text{[Equation 4]}$$

$$F_s(N) + \left\lceil \frac{\left\lceil \frac{bw}{BW} \right\rceil}{2} \right\rceil \times BW + \frac{BW}{2}$$

A STA can calculates a center frequency of WLAN channels which start in the TV channel N and exists on frequency area of the available TV channels using equation 3 and 4, in case that a center frequency of a WLAN channel is on a center frequency of a TV channel. At this time, bw can be an arbitrary value. Or bw can be 5, 10, 20 or 40. But, bw should satisfy equation 3 for given M.

And, a starting frequency of WLAN channel, $f_s$ is as equation 5.

$$f_s = f_c - \frac{bw}{2} \qquad \text{[Equation 5]}$$

Figure 10:
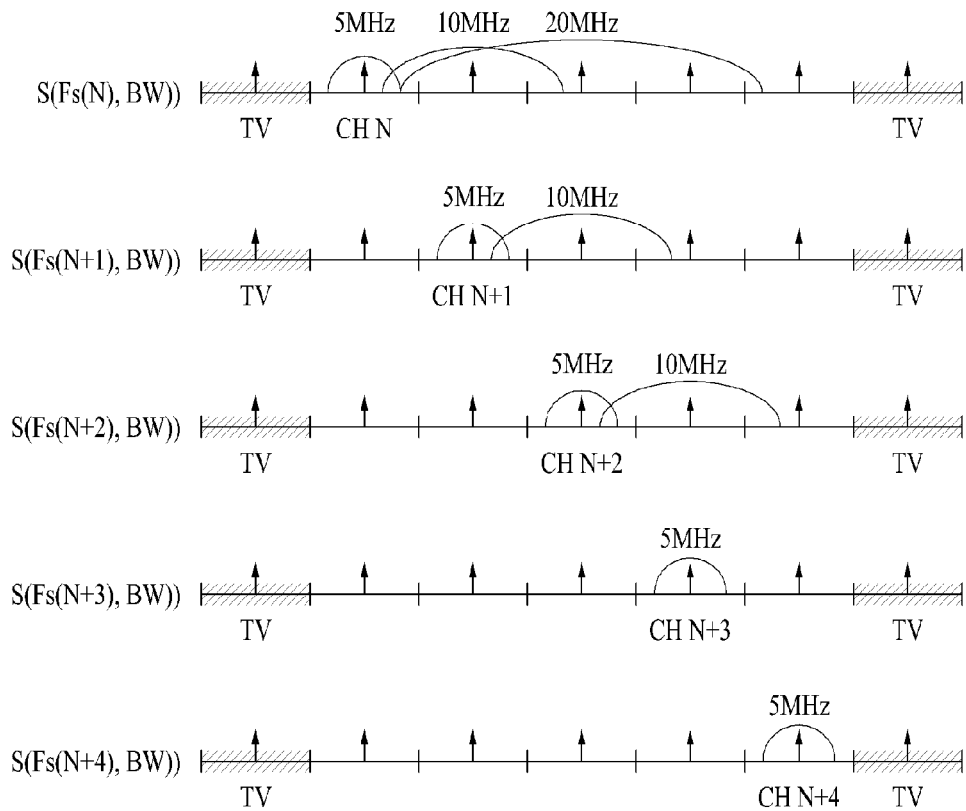
FIG. 10 shows an example of finding out WLAN channels, which start in range of each of consecutive available TV channels and exists on frequency area of the consecutive available TV channels, in case that a center frequency of a WLAN channel is on a center frequency of a TV channel.

FIG. 10 shows an example of finding out WLAN channels, which start in range of each of consecutive available TV channels and exists on frequency area of the consecutive available TV channels, in case that a center frequency of a WLAN channel is on a center frequency of a TV channel.

FIG. 10 illustrates a case that WLAN channel bandwidths are 5 MHz, 10 MHz, 20 MHz and 40 MHz, TV channel bandwidth is 6, and consecutive available TV channels are TV channels from N to N+4.

In FIG. 10, $S(F_s(N), BW)$ represents a set of WLAN channels, which start in TV channel N and exists on frequency area of the consecutive available TV channels.

As shown in FIG. 10, $S(F_s(N), BW)$ includes 3 WLAN channels, each of $S(F_s(N+1), BW)$ and $S(F_s(N+2), BW)$ includes 2 WLAN channels, each of $S(F_s(N+3), BW)$ and $S(F_s(N+4), BW)$ includes 1 WLAN channel. Thus, consecutive available TV channels from N to N+4 include 9 WLAN channels.

A scheme of finding out a center frequency of each of WLAN channels, which start in a TV channel, in case that a center frequency of a WLAN channel is on a lower boundary of a TV channel will be explained referring FIG. 11.

FIG. 11 shows WLAN channels which start in a TV channel N in case that a center frequency of a WLAN channel is on a lower boundary of a TV channel. WLAN channels illustrated in FIG. 10 start in a TV channel N and bandwidth of each of them is 5 MHz, 10 MHz, 20 MHz and 40 MHz, respectively.

In case that a center frequency of a WLAN channel is on a lower boundary of a TV channel, a center frequency of WLAN channels, which start in the TV channel N, satisfies equation 6.

$$f_c - F_s(N) = x \times BW \qquad \text{[Equation 6]}$$

x satisfies equation 7 for predefined bandwidth of a WLAN channel, bw.

$$BW \times (x-1) < \frac{bw}{2} \leq BW \times x \qquad \text{[Equation 7]}$$

Bandwidth of a WLAN channel should satisfy equation 8 so that the WLAN channel exists on frequency area of the consecutive available TV channels.

$$\left\lceil \frac{\frac{bw}{2}}{BW} \right\rceil \leq \frac{M}{2} \qquad \text{[Equation 8]}$$

In the Equation 8, M represents the sum of 1 and the number of TV channels which exist after TV channel N among consecutive available TV channels.

For example, if the number of consecutive available TV channels is L and first TV channel among consecutive available TV channels is TV channel N, set of consecutive available TV channels is $\{N, N+1, N+1, \ldots, N+L-1\}$. And M is L for TV channel N, M is L−1 for TV channel N−1, and M is 1 for TV channel N+L−1.

Equation 9 can be derived from equation 6 and equation 7.

$$f_c = F_s(N) + \left\lceil \frac{\frac{bw}{2}}{BW} \right\rceil \times BW \qquad \text{[Equation 9]}$$

A STA can a center frequency of WLAN channels which start in the TV channel N and exists on frequency area of the available TV channels using equation 8 and 9, in case that a center frequency of a WLAN channel is on lower boundary of a TV channel. At this time, bw can be an arbitrary value. Or bw can be 5, 10, 20 or 40. But, bw should satisfy equation 3 for given M.

And, a starting frequency of a WLAN channel, $f_s$ is as equation 5.

A STA calculates center frequency of each of first WLAN channels which start in range of each of consecutive available TV channels and exists on frequency area of the consecutive available TV channels using equation 3 and 4, wherein a center frequency of each of the first WLAN channels is on a center frequency of a TV channel.

And, the STA calculates center frequency of each of second WLAN channels which start in range of each of consecutive available TV channels and exists on frequency area of the consecutive available TV channels using equation 8 and 9, wherein a center frequency of each of the second WLAN channels is on a lower boundary of a TV channel.

Then, the STA aggregates the first WLAN channels and the second WLAN channels to acquire a set of WLAN channels which is mapped to the consecutive available TV channels.

The STA derives WLAN channel number of each of WLAN channels from a center frequency and WLAN channel bandwidth using the WLAN channel number equation in step S830. Or it can also derives WLAN channel number of each of WLAN channels from a starting frequency of each of WLAN channels and WLAN channel bandwidth using the WLAN channel number equation.

Next, a method of converting TV channel into WLAN channel in a wireless local area network system (WLAN) according to second embodiment of the present is explained referring to draws.

FIG. 12 shows a method of converting TV channel into WLAN channel in a wireless local area network system (WLAN) according to second embodiment of the present.

Like first embodiment of the present invention, a STA has a WLAN channel number equation and a TV channel table for matching TV channel number and a starting frequency of TV channel in second embodiment of the present.

A STA receives WSM including available TV channel list. If a format of available TV channel list in WSM is not bitmap, a STA convert it into bitmap. That is, a STA matches each of entire TV channels into 1 or 0. For example, a STA matches an available TV channel to 0, and occupied TV channel to 1.

As shown in FIG. 12, a STA derives WLAN channel set from bitmap using the TV channel table and an algorithm for searching WLAN channels. And then, a STA derives WLAN channel number set from WLAN channel set using the WLAN channel number equation.

The algorithm for searching WLAN channels is explained referring FIG. 13.

FIG. 13 shows algorithm for searching WLAN channels.

In FIG. 13, Cb represents a WLAN channel whose center frequency is on center frequency of a TV channel and whose bandwidth is b. Element (x, y) represents WLAN cannels which start TV channel y and is added when TV channel x is added to available TV channels.

According to the algorithm for searching WLAN channels, WLAN channels are added to a set of WLAN channels which exist on frequency area of the available TV channels whenever a TV channel is added to consecutive available TV channels.

In FIG. 13, a set of WLAN channels which exist on frequency area of the available TV channels is {C5} when a list of available TV channels includes only TV channel 1, wherein C5 starts in range of TV channel 1.

If TV channel 2 is added to a list of available TV channels, C5, B5 and B10 are added to the set of WLAN channels.

And then, if TV channel 3 is added to a list of available TV channels, C5, B5, B10 and C10 are added to the set of WLAN channels, wherein C5, B5 and B10 start in range of TV channel 3 and C10 starts in range of TV channel 2.

And then, if TV channel 4 is added to a list of available TV channels, C5, B5, B10 and C10, B20 are added to the set of WLAN channels, wherein C5, B5 and B10 start in range of TV channel 4 and C10 and B20 start in range of TV channel 3.

And then, if TV channel 5 is added to a list of available TV channels, C5, B5, B10, C10, B20 and C20 are added to the set of WLAN channels, wherein C5, B5 and B10 start in range of TV channel 5, C10 and B20 start in range of TV channel 4 and C20 starts in range of TV channel 3.

When TV channels from 1 to 5 are available, a set of WLAN channels which exist on frequency area of the available TV channels is a slash zone in FIG. 13.

A set of WLAN channels, which is mapped to the consecutive available TV channels, determined according to second embodiment of the present is same as that determined according to first embodiment of the present.

FIG. 14 shows the algorithm for searching WLAN channels according to second embodiment of the present.

Next, a method of converting a WLAN channel into a TV channel in a wireless local area network system (WLAN) according to third embodiment of the present is explained referring to FIG. 15.

A center frequency and bandwidth of a WLAN channel together specify a WLAN channel number. Thus, a STA can derive a center frequency and bandwidth of a WLAN channel from a WLAN channel number of the WLAN channel. And it can derive TV channels mapped to the WLAN channel from a center frequency and bandwidth of the WLAN channel.

FIG. 15 shows TV channels mapped to a WLAN channel.

In FIG. 15, $F_s$ represents a starting frequency of an arbitrary TV channel $N_0$, BW represents bandwidth of a TV channel, fc represents center frequency of the WLAN channel, and bw represents bandwidth of the WLAN channel.

TV channel number of first TV channel in a set of TV channels mapped to the WLAN channel is as equation 10.

$$N_0 + \left\lfloor \frac{f_s - F_s}{BW} \right\rfloor = N_0 + \left\lfloor \frac{f_c - bw/2 - F_s}{BW} \right\rfloor \quad \text{[Equation 10]}$$

TV channel number of last TV channel in a set of TV channels mapped to the WLAN channel is as equation 11.

$$N_0 + \left\lfloor \frac{f_s + bw - F_s}{BW} \right\rfloor = N_0 + \left\lfloor \frac{f_c + bw/2 - F_s}{BW} \right\rfloor \quad \text{[Equation 11]}$$

Therefore, a set of TV channels mapped to the WLAN channel is as equation 12.

$$\left[N_0 + \left\lfloor \frac{f_c - bw/2 - F_s}{BW} \right\rfloor, N_0 + \left\lfloor \frac{f_c + bw/2 - F_s}{BW} \right\rfloor\right] = \quad \text{[Equation 12]}$$
$$\left\{N_0 + \left\lfloor \frac{f_c - bw/2 - F_s}{BW} \right\rfloor, N_0 + \left\lfloor \frac{f_c - bw/2 - F_s}{BW} \right\rfloor + 1, \right.$$
$$\left. \ldots, N_0 + \left\lfloor \frac{f_c + bw/2 - F_s}{BW} \right\rfloor\right\}$$

A method of converting a WLAN channel into a TV channel can be used when a STA makes a channel measurement report. A STA can perform sensing on TV channels after converting WLAN channels into TV channels.

Next, an example of available WLAN channel changed by a primary signal will be explained referring FIG. 16.

FIG. 16 shows an example of available WLAN channel change by a primary signal having low transmission power and small bandwidth.

A STA can perform sensing on TV channels, and report TV channel number of TV channels in which primary signal is detected or a set of WLAN channels mapped to available TV channels.

It is inefficient not to use a TV channel in which a primary signal such as microphone having low transmission power and small bandwidth. Thus, a STA can use an area of a TV channel except an area occupied by a primary signal such as microphone. In FIG. 16, a STA can use an area of a TV channel M except [f1, f2].

When a STA detects a primary signal such as microphone, it reports a set of available WLAN channels changed by appearance of the primary signal such as microphone.

WLAN channels which become unavailable by appearance of the primary signal such as microphone satisfy equation 13 and equation 14.

$$fs = fc - bw/2 < f2 \quad \text{[Equation 13]}$$

$$fs + bw = fc + bw/2 > f1 \quad \text{[Equation 14]}$$

fs represents a starting frequency of a WLAN channel, fc represents a center frequency of a WLAN channel, bw represents bandwidth of a WLAN channel, f1 is a starting frequency of an area occupied by a primary signal such as microphone and f2 is a ending frequency of an area occupied by a primary signal such as microphone.

A set of available WLAN channels changed by appearance of the primary signal such as microphone can be acquired by eliminating WLAN channels satisfying equation 13 and equation 14 from a set of available WLAN channels before the primary signal such as microphone is detected.

Figure 17:
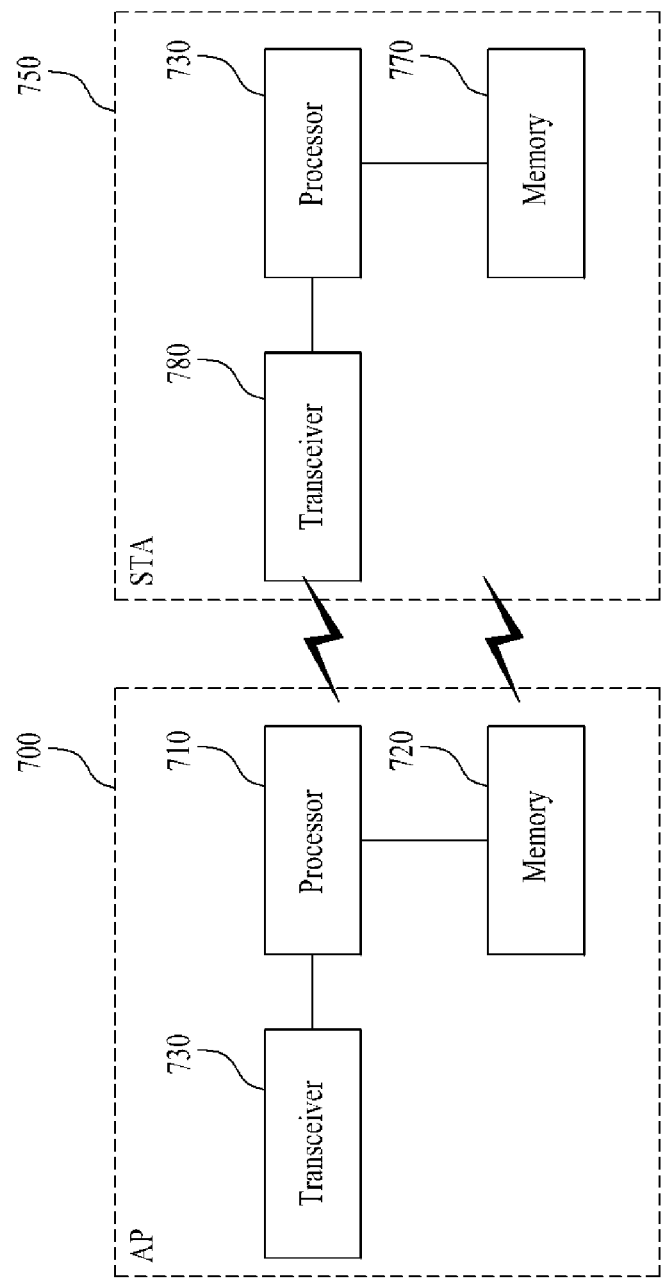
FIG. 17 is a schematic block diagram of wireless apparatuses implementing an exemplary embodiment of the present invention.

FIG. 17 is a schematic block diagram of wireless apparatuses implementing an exemplary embodiment of the present invention.

An AP 700 can include a processor 710, a memory 720, a transceiver 730, and a STA 750 may include a processor 760, a memory 770, and a transceiver 780. The transceivers 730 and 780 transmit/receive a radio signal and implement an IEEE 802 physical layer. The processors 710 and 760 are connected with the transceivers 730 and 760 to implement an IEEE 802 physical layer and/or MAC layer. The processors 710 and 760 may implement the above-described channel scanning method.

The processors 710 and 760 and/or the transceivers 730 and 780 may include an application-specific integrated circuit (ASIC), a different chip set, a logical circuit, and/or a data processing unit. The memories 720 and 770 may include a read-only memory (ROM), a random access memory (RAM), a flash memory, a memory card, a storage medium, and/or any other storage units. When an exemplary embodiment is implemented by software, the above-described scheme may be implemented as a module (process, function, etc.) performing the above-described functions. The module may be stored in the memories 720 and 770 and executed by the processors 710 and 760. The memories 720 and 770 may be disposed within or outside the processors 710 and 760 and connected with the processors 710 and 760 via well-known means.

Among these elements of apparatuses for AP/STA, the structure of processor 710 or 760 will be more specifically explained.

Figure 18:
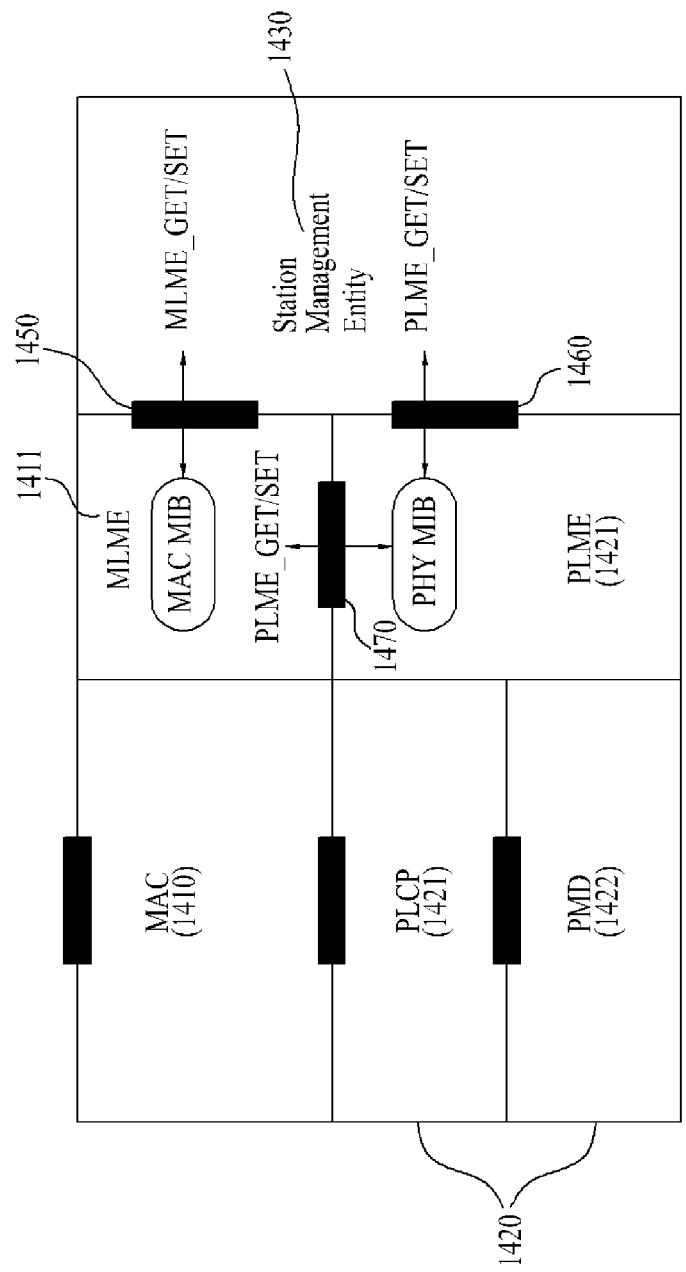
FIG. 18 shows an exemplary structure of processor of STA apparatus according to one embodiment of the present invention.

FIG. 18 shows an exemplary structure of processor of STA apparatus according to one embodiment of the present invention.

Processor 710 or 760 of STA may have multiple layer structures, and FIG. 18 especially focuses on MAC sublayer (1410) on data link layer (DLL) and Physical layer (1420) among these layers. As shown in FIG. 18, PHY (1420) may include PLCP entity (physical layer convergence procedure entity; 1421) and PMD entity (physical medium dependent entity; 1422). Both the MAC sublayer (1410) and PHY (1420) conceptually include management entities, called MLME (MAC sublayer Management Entity; 1411) and PLME (physical layer management entity; 1421), respectively. These entities (1411, 1421) provide the layer management service interfaces through which layer management functions can be invoked.

In order to provide correct MAC operation, an SME (Station Management Entity; 1430) is present within each STA. The SME (1430) is a layer independent entity that can be viewed as residing in a separate management plane or as residing "off to the side." The exact functions of the SME (1430) are not specified in this document, but in general this entity (1430) can be viewed as being responsible for such functions as the gathering of layer-dependent status from the various layer management entities (LMEs), and similarly setting the value of layer-specific parameters. SME (1430) would typically perform such functions on behalf of general system management entities and would implement standard management protocols.

The various entities within FIG. 18 interact in various ways. FIG. 18 shows some examples of exchanging GET/SET primitives. XX-GET.request primitive is used for requesting the value of the given MIBattribute (management information base attribute). XX-GET.confirm primitive is used for returning the appropriate MIB attribute value if status="success," otherwise returning an error indication in the Status field. XX-SET.request primitive is used for requesting that the indicated MIB attribute be set to the given value. If this MIB attribute implies a specific action, then this requests that the action be performed. And, XX-SET.confirm primitive is used such that, if status="success," this confirms that the indicated MIB attribute was set to the requested value, otherwise it returns an error condition in status field. If this MIB attribute implies a specific action, then this confirms that the action was performed.

As shown in FIG. 18, MLME (1411) and SME (1430) may exchange various MLME_GET/SET primitives via MLME_SAP (1450). According to one example of the present invention, SME (1430) may transmit MLME_WSM.request primitive to MLME (1411) for requesting MLME (1411) to transmit the White Space Map Announcement Frame to another STA. In other case, MLME (1411) may transmit MLME-WSM.indication primitive to SME (1430) to indicate the reception of the White Space Map Announcement Frame from another STA.

Also, as shown in FIG. 18, various PLCM_GET/SET primitives may be exchanged between PLME (1421) and SME (1430) via PLME_SAP (1460), and between MLME (1411) and PLME (1470) via MLME-PLME_SAP (1470).

WSM element of one example of the present invention can be transmitted by the sequential procedures of MAC (1410) and PHY (1420). Also, WSM element of one example of the present invention can be received by the sequential procedures of PHY (1420) and MAC (1410).

Although the embodiments of the present invention have been disclosed in view of each aspect of the invention, those skilled in the art will appreciate that embodiments of each aspect of the invention can be incorporated. And, there can be advantages not explicitly discussed, since they are obvious from the description for those skilled in the art.

The invention claimed is:

1. A method for a device for a wireless local area network (WLAN) system to operate in a whitespace spectrum, the method comprising:
obtaining available channel information from another device;
scanning for access points based on the available channel information; and
determining a center frequency of an operating channel in the WLAN system, wherein the operating channel is determined based on the scanning,
wherein the center frequency of the operating channel is determined according to an equation:

$C = S + (B*f(bw)) + (0.5*B)$ where C is the center frequency of the operating channel,
S is a starting frequency,
B is a whitespace channel bandwidth,
bw is the operating channel bandwidth,
f(bw) is a value determined according to the operating channel bandwidth.

2. The method according to claim 1, further comprising:
obtaining information including an operating channel bandwidth in the WLAN system.

3. The method according to claim 1, wherein the operating channel spans a consecutive plurality of whitespace channels.

4. The method according to claim 1, wherein f(bw) has a positive integer value.

5. The method according to claim 1, wherein B is 6 MHz, 7 MHz, or 8 MHz.

6. The method according to claim 1, wherein the whitespace is a TV whitespace.

7. The method according to claim 1, wherein a White Space Map (WSM) indicates the available channel information.

8. The method according to claim 7, wherein the WSM includes a list of available channels and maximum allowed transmission power information of the available channels.

9. The method according to claim 1, wherein the device is TV band device.

10. A device for a wireless local area network (WLAN) system to operate in a whitespace spectrum, the device comprising:
a transceiver; and
a processor,
wherein the processor is configured to:
obtain available channel information from another device;
scan for access points based on the available channel information;
determine a center frequency of an operating channel in the WLAN system, wherein the operating channel is determined based on the scanning, wherein the center frequency of the operating channel is determined according to an equation:

$$C = S + (B * f(bw)) + (0.5 * B)$$

where C is the center frequency of the operating channel,
S is a starting frequency,
B is a whitespace channel bandwidth,
bw is the operating channel bandwidth,
f(bw) is a value determined according to the operating channel bandwidth.

* * * * *